(12) United States Patent
Worsley (10) Patent No.: US 9,560,026 B1
(45) Date of Patent: Jan. 31, 2017

(54) SECURE COMPUTER OPERATIONS (71) Applicant: Amazon Technologies, Inc., Reno, NV (US)

(72) Inventor: Timothy Craig Worsley, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 425 days.

(21) Appl. No.: 13/746,604

(22) Filed: Jan. 22, 2013

(51) Int. Cl.
G06F 7/04 (2006.01)
H04L 29/06 (2006.01)

(52) U.S. Cl.
CPC .................... H04L 63/08 (2013.01)

(58) Field of Classification Search
CPC .... G06F 21/123; G06F 21/335; G06F 21/629; G06F 21/31; G06F 21/33; G06F 2221/2111
USPC ............. 726/4, 26, 29, 34; 380/277
See application file for complete search history.

(56) References Cited

U.S. PATENT DOCUMENTS

| | | | | |
|---|---|---|---|---|
| 8,406,736 | B2* | 3/2013 | Das et al. | 455/410 |
| 8,996,744 | B1* | 3/2015 | Marr et al. | 710/8 |
| 2004/0054894 | A1* | 3/2004 | Lambert | 713/165 |
| 2008/0062940 | A1* | 3/2008 | Othmer et al. | 370/338 |
| 2011/0173682 | A1* | 7/2011 | Perry et al. | 726/4 |
| 2011/0282697 | A1* | 11/2011 | Fitzgerald et al. | 705/4 |
| 2012/0303827 | A1* | 11/2012 | Neystadt et al. | 709/229 |
| 2013/0023280 | A1* | 1/2013 | Paddon et al. | 455/456.1 |
| 2013/0115915 | A1* | 5/2013 | Tipton et al. | 455/411 |
| 2013/0191903 | A1* | 7/2013 | Jaudon et al. | 726/7 |
| 2013/0214902 | A1* | 8/2013 | Pineau et al. | 340/5.61 |
| 2013/0252583 | A1* | 9/2013 | Brown et al. | 455/411 |
| 2013/0315392 | A1* | 11/2013 | Steinhauser | 380/258 |
| 2013/0340071 | A1* | 12/2013 | Vellozo Luz et al. | 726/18 |
| 2013/0343364 | A1* | 12/2013 | Fuller | 370/338 |

OTHER PUBLICATIONS

Zhang et al, I Am the Antenna: Accurate Outdoor AP Location Using Smartphones, Sep. 23, 2011, ACM, pp. 109-120.*
Tao et al, Wireless Lan Location-Sensing for Security Applications, Sep. 19, 2003, ACM, pp. 11-20.*

* cited by examiner

Primary Examiner — Bradley Holder
Assistant Examiner — Jenise Jackson
(74) Attorney, Agent, or Firm — Lee & Hayes, PLLC (57) ABSTRACT In some implementations, a computing device includes an identifier that is embedded into a firmware of the computing device. The identifier uniquely identifies the computing device from other computing devices. The computing device may send a request to a server to provide credentials to enable the computing device to access a secured resource, such as secured data or a secured system. The computing device may provide the server with the identifier to enable the server to determine whether the computing device is authorized to access the secured resource. If the server determines that the computing device is authorized, the server may provide the credentials to the computing device. If the server determines that the computing device is unauthorized, the server may cause the computing device to perform one or more actions to render the computing device inoperable and/or render the resource inaccessible.

23 Claims, 4 Drawing Sheets

SECURE COMPUTER OPERATIONS

BACKGROUND

Organizations often provide computing devices, such as laptop computers and other types of mobile devices, for use by their employees. These computing devices may include data that the organizations want to protect from industrial espionage. For example, companies may want data associated with new products, sales projections, expansion plans, and the like to be securely stored on the computing devices that are provided to employees to prevent the information from being obtained by non-employees, such as competitors. As another example, government agencies may wish to protect sensitive government data stored on employee computer devices from being obtained by other governments.

A typical solution to protect data on a computing device is to password protect the computing device and/or the storage device used by the computing device. However, such protection schemes may be easily circumvented. For example, the password may be guessed using information about the employee, such as the employee's birthday, mother's maiden name, pet's name, names of the employee's children, etc. As another example, a password generator may be used to generate and test many passwords. As yet another example, because the protection scheme must compare an entered password with the correct password, the correct password may be stored on the storage device, enabling a software program to identify the correct password by scanning the contents of the storage device. As a further example, the employee may be bribed or coerced into providing the correct password. Thus, protection schemes used to protect and/or secure data on a computing device may be circumvented in a variety of ways.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques that can be used to operate computers, servers, tablets, phones and other computing devices in network environments that may not be controlled or secure, and to prevent or limit continued operation of such computing devices when they are lost, stolen, or otherwise in the possession of unauthorized or hostile entities. For example, credentials that enable a computing device to access secured data or secured systems (e.g., computing systems or networks) may be stored on a server (e.g., an authorization server). The secured data may be stored on the computing device, on another computing device, or both. For example, the secured data may include an operating system of the computing device where the computing device cannot boot until the secured data is decrypted. Each computing device may include identity information that is stored at a very low level (e.g., in firmware) of the computing device. For example, the identity information may be stored in the firmware of the computing device when the computing device is initially provisioned. Such a protection scheme may not be easily circumvented because the credentials to enable access to the secured data are not stored on the computing device or in a memory of a user. In addition, the server may be notified if a computing device is lost or stolen and the server may not provide credentials to computing devices that have been identified as lost or stolen.

When a computing device sends a request to the server for credentials to access secured data, the server may authenticate the identity information associated with the computing device. If the server successfully authenticates the identity information of the computing device, the server may provide the credentials to the computing device. If the server is unsuccessful in authenticating the identity information of the computing device, one or more protective actions may be performed by the server or the computing device. For example, the server may perform actions to limit what the computing device may access. As another example, the server may send a command to the computing device to wipe the storage drive of the computing device, disable networking capabilities of the computing device, disable the computing device, blacklist the computing device such that the computing device cannot access certain information on the computing device and/or networked locations, perform other actions that limit what the computing device can do, or any combination thereof.

In some implementations described herein, the firmware of a computing device (or a component of the computing device) may be customized to contact an authorization server periodically (e.g., each time the computer device boots up) to enable the authorization server to authenticate an identity of the computing device, and/or to obtain authorization for continued operations of the computer device. For example, a firmware of a network interface card (NIC) of the computing device may include a unique identifier. In addition, the NIC may monitor all incoming and outgoing communications between the computing device and external devices and/or systems. The authorization server may maintain a database (e.g., a central registry) of authorized computers, and may limit authorization to computing devices that are included in the registry based on an identity of each computing device. If a computing device is lost or stolen, the identity of the computing device may be removed from the central registry so that the computing device is unable to obtain authorization or credentials from the authorization server.

Upon failure to authenticate with and or obtain authorization from the authorization server, the firmware may be configured to implement security measures within the computing device or with respect to individual peripherals of the computing device. Such security measures may include refusing to boot the computing device, refusing access to certain peripherals, erasing or destroying a storage device of the computing device, and so forth. The security measures may also include initiating remote reporting procedures to report computer-related information to the authorization server or some other entity. For example, a keystroke logging program might be initiated to report keystrokes made on the computing device. As another example, a camera associated with or built-in to the computing device may be used to capture and transmit a picture or a video of a person operating the computing device. Depending on the capabilities of the computing device, it may be possible also to report a location of the computing device, accounts accessed by the computing device, network addresses accessed by the computing device, and so forth. Such reporting may allow investigators to locate and recover the computing device, or to identify the parties who are using the computing device.

In some cases, when determining whether to provide credentials to a computing device, the authorization server may take into account other information associated with the computing device, such as a location of the computing device, a location being accessed by the computing device, a type of access being requested by the computing device, another type of information, or any combination thereof. For example, the authorization server may authenticate or provide credentials to the computing device only when the computing device is located in one or more predetermined locations (e.g., employer locations or a specified set of countries). The location of the computing device may be obtained by the authorization server using different techniques, such as receiving global positioning system (GPS) data from the computing device, analyzing a path taken by data transmitted from the computing device, and the like. If the computing device requests credentials to access secured data when the computing device is not in a previously approved/authorized location, the authorization server may deny the request for credentials based on the computing device's location. For example, a government employee's computing device may be provided access to secured data when the computing device is in pre-designated locations, such as a particular country, within a consulate building in foreign countries, etc.

Thus, access to credentials that enable access to secured data or secured systems/networks may be centralized in the cloud (e.g., on a server or a set of servers). Computing devices that have an identifier embedded at a low level (e.g., in a firmware of the computing devices) may be provided access to the credentials. Access to the credentials may be quickly and easily revoked, either automatically or based on user input, if a computing device used to access the credentials falls into the wrong hands. The server may determine an identity of a computing device based on the embedded identifier. Based on the identifier and, in some cases, based on other information (e.g., a location of the computing device), the server may authenticate the computing device when determining whether to provide credentials to the computing device. If the server is unable to authenticate the computing device, the server may not provide the computing device with the credentials used to access secured data. In some cases, if the server is unable to authenticate the computing device, the computing device may perform one or more protective actions, such as disabling access to one or more resources (e.g., a storage device or a network interface) of the computing device. In this way, multiple computing devices may operate securely.

Figure 1:
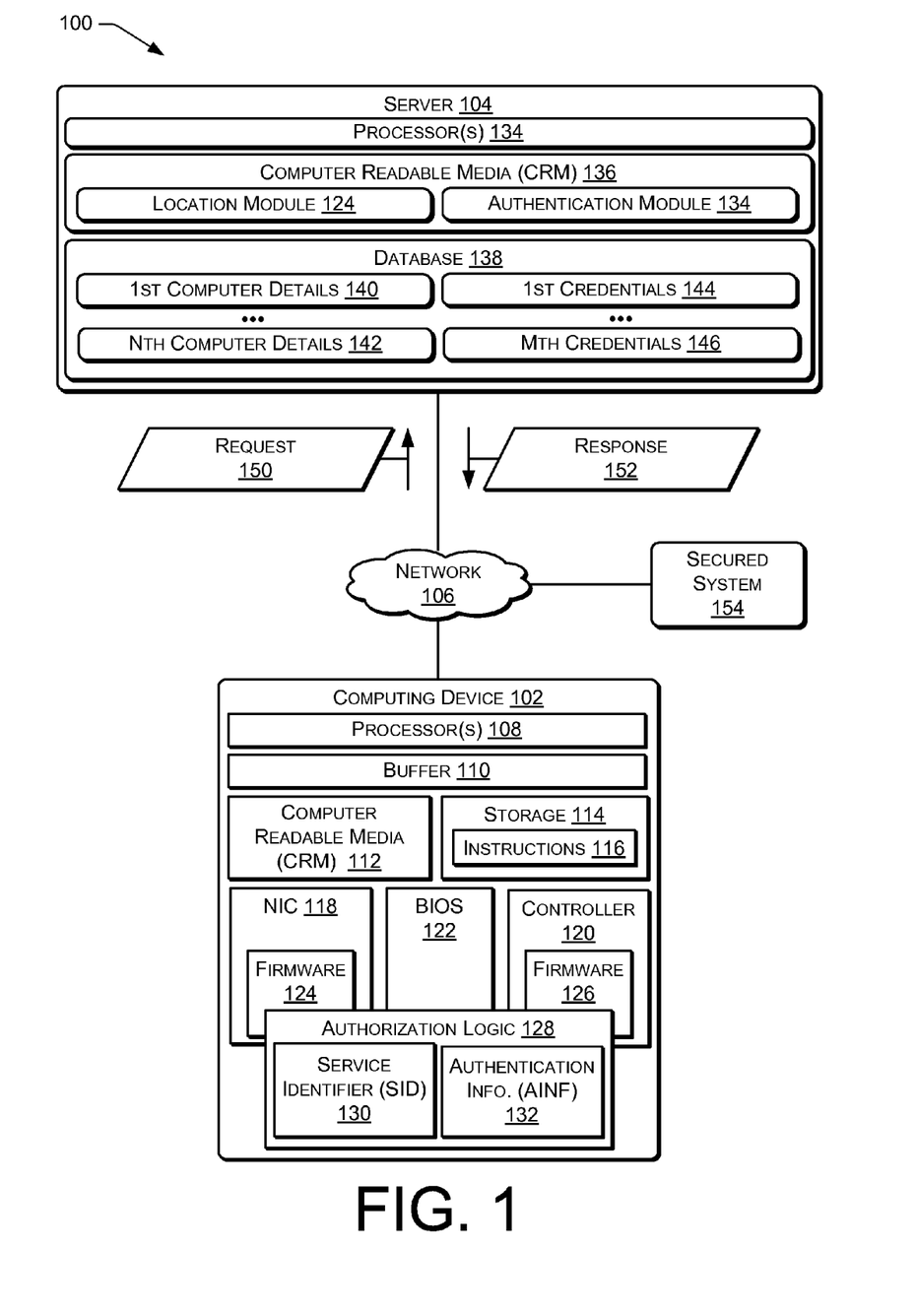
FIG. 1 is a block diagram illustrating a system for secure computer operations according to some implementations.

FIG. 1 is a block diagram illustrating a system 100 for secure computer operations according to some implementations. The system 100 includes a computing device 102 that is communicatively coupled to a server 104 (e.g., an authorization server) using a network 106. The computing device 102 may be configured to request authorization for operations from the server 104 and to request credentials from the server 104 to access encrypted (e.g., secured) data or a secured system (e.g., a network of computers that only authorized computing devices may access). Furthermore, note that the server 104 may perform a variety of services in addition to these described herein. In addition, though the server 104 is illustrated in FIG. 1 as a single server, in some implementations the server 104 may include multiple servers. For example, the variety of services may be distributed among and performed by the multiple servers.

The computing device 102 may include one or more processor(s) 108, a buffer 110, one or more computer-readable media (CRM) 112 (e.g., random-access memory), and non-volatile storage 114. The storage 114 may be a form of non-volatile memory or mass storage, such as a hard disk or non-volatile flash memory. The storage 114 may be used to store software instructions, such as device drivers, an operating system, software applications, that are executable by the processors 108 to perform various functions. The computing device 102 may additionally have other types of computer-readable media, including removable devices such as floppy disks, compact disks, memory cards, and so forth. While a representative computing device (e.g., the computing device 102) is illustrated in FIG. 1, in a typical implementation, multiple computing devices may be communicatively coupled to the server 104 using the network 104.

The buffer 110 may be used to store credentials to enable the computing device 102 to access secured data. For example, the server 104 may securely write (or send) the credentials directly to the buffer 110 to prevent the credentials from being exposed (or otherwise accessible) to a user of the computing device 102. In some cases, the credentials may be cryptographically encrypted and the authorization logic 128 may decrypt the credentials that are written to the buffer 110. The buffer 110 may be accessible to the authorization logic 128 but inaccessible to other components of the computing device 102. For example, in some implementations, the authorization logic 128 may be embedded into the firmware 124 and the buffer 110 may be accessible to the firmware 124 but inaccessible to other components of the computing device 102.

The computer-readable memory 112 of the computing device 102 may store programs, program modules, routines, drivers, and so forth, which comprise instructions that are accessible and executable by the processor(s) 108 to perform various functions. As an example, an operating system (OS) may be stored in the storage 114 and portions of the operating system may be temporarily swapped into the computer-readable memory 112 for execution by the processor(s) 108. The operating system may implement the basic functionality of the computing device 102, including user interface elements and other functionality. More specialized applications may also be stored in the storage 114 and temporarily swapped into the computer-readable memory 112 for execution by the processor(s) 108.

The computing device 102 may also have various types of hardware interfaces, components, and other peripherals. As an example, FIG. 1 shows a network interface card (NIC) 118 and a storage controller 120. The NIC 118 is configured to implement network communications on behalf of the computing device 102, such as communications over the network 106. The network 106 may include private networks and public networks such as the Internet. The NIC 118 and network 106 may utilize various types of networking technologies, including wired, wireless, and cellular networking technologies. The NIC 118 may monitor incoming and outgoing traffic between the computing device 102 and other devices, such as communications that the computing device 102 sends and receives using the network 106.

The storage controller 120 may be associated with the storage 114, such as may be the case with a hard disk and its associated controller. In some cases, the storage 114 and the storage controller 120 may be elements of an integrated hardware device. In other cases, the storage controller 120 may be part of a computer motherboard to which the storage 114 is connected. The storage controller 120 may provide access by the processor 106 to the storage 114, and may control operations of the storage hardware (such as a hard disk) that is used to implement the storage 114. In some embodiments, the storage controller 120 may perform encryption and decryption of the storage 114.

The computing device 102 may have or be associated with various types of boot memory, including firmware. Firmware generally comprises non-volatile computer-readable media or memory containing instructions that are executed by the processor 106 upon startup of the computing device 102 or startup of an associated hardware component. For example, the computing device 102 may have a system basic input output system (BIOS) 122. The system BIOS 122 may comprise non-volatile memory containing instructions that the processor 106 executes upon startup. The BIOS instructions may initialize various subsystems, such as networking systems, storage systems, and so forth. The BIOS 122 may also contain instructions and functionality that are used during normal, non-startup operations of the computing device 102.

Various computer peripherals may also have firmware. Note that such firmware may include instructions that are executed for normal operations of the peripherals, as well as boot firmware that is executed upon startup of the peripherals. For example, the NIC 118 may have firmware 124 that is executed upon startup of the computing device 102, to initialize the NIC 118. Likewise, the storage controller 120 may have firmware 126 that is executable to initialize storage capabilities of the computing device 102. The instructions stored by the firmware 124 and/or 124 may be executed upon startup by the processor(s) 108 or by processors associated with the NIC 118 and storage controller 120. Certain portions of the firmware of the various computer peripherals may also be invoked during normal, post-startup operations of the computing device 102. The firmware 124, 126 and the BIOS 122 may be stored in a read only memory (ROM), such as electrically erasable programmable ROM (EEPROM). For example, the EEPROM may enable the authorization logic 128 to be embedded into the computing device 102 when the computing device is initially provisioned.

One or more of the subcomponents of the computing device 102 may be configured as boot devices or components. Thus, the system BIOS 122 may be configured to perform low level initializations, and to then look to a peripheral device or subcomponent for higher level instructions. A boot device may contain or provide access to operating software for a computer, such as an operating system. A boot device may also contain or provide access to instructions for provisioning a computer.

The computing device 102 may be configured through its BIOS 122 to initially use the storage 114 as a boot device. The NIC 118 may be configured by way of its firmware 124 to contact the authorization server 104 through the network 106 for authorization, credentials, provisioning information, software, other data, or any combination thereof. The authorization server 104 may be maintained by a business entity to automatically provision its own computers, or may be maintained by a service provider for use by multiple customers of the service provider.

Conventional communications protocols such as the Internet Protocol (IP) may be used for communication between the various entities shown in FIG. 1. In particular, IP version 4 (IPV4) and/or version 6 (IPV6) may be used in certain embodiments for communications between the computing device 102 and the authorization server 104.

The authorization server 104 may be identified and accessed by a specific network address. In the Internet environment, the authorization server 104 may be identified by a unique IP address or Universal Resource Locator (URL). Other forms of global identification may also be used to uniquely identify the provisioning service among different network entities that are accessible through the network 106.

The computing device 102 may have provisioning/authorization logic 128 embedded within firmware, such as in the BIOS 122, the firmware 124 of the NIC 118, the firmware 126 of the storage controller 120, the firmware of other components associated with the computing device 102, or any combination thereof. The provisioning/authorization logic 128 may be configured to be executed upon computer startup and to initially provision the computing device 102 from the authorization server 104. In addition, the provisioning/authorization logic 128 may be configured to repeatedly contact the authorization server 104 to obtain authorization for continuing operations of the computing device 102, and to at least partially disable the computing device 102 upon failure to obtain such authorization.

In some embodiments, the provisioning/authorization logic 128 may include a service identifier (SID) 130 identifying the authorization server 104 from which the computing device 102 is to obtain credentials. The service identifier 130 may be an IP address, a URL, or some other type of location identifier allowing the computing device 102 to identify and access the authorization server 104 via the network 106.

The provisioning/authorization logic 128 may in some embodiments be further customized to contain authentication information (AINF) 132. The authentication information 132 may enable the computing device 102 to verify the identity of the authorization server 104, and may enable the authorization server 104 to authenticate the computing device 102. Using the authentication information 132, the computing device 102 can ensure that it is communicating with the intended authorization server 104. Similarly, the authorization server 104 may ensure that it provisions only authorized computers. The authentication information 132 may also enable the authorization server 104 to reliably identify the computing device 102, and to thereby provide customized provisioning information and software for different computing devices. For example, the authentication information 132 may include an identifier that uniquely identifies the computing device 102. The server 104 may be able to quickly and easily identify a particular computing device from multiple computing devices based on the unique identifier included in the authentication information 132.

The provisioning/authorization logic 128 may be further configured to condition operation of the computing device 102 upon receiving continuing authorization from the authorization server 104. For example, the provisioning/authorization logic 128 may be configured upon every startup of the computing device 102 to contact the authorization server 104, to authenticate with the authorization server 104, and to query the authorization server 104 regarding continued operation under the currently provisioned configuration.

Upon failure to receive authorization, the provisioning/authorization logic may limit or disable the computing device 102 or its peripherals.

As an example, the BIOS 122 may be configured to refuse to boot the computing device 102 upon failure to obtain authorization from a central service such as the authorization server 104. As another example, the storage controller 120 may be configured through its firmware 126 to deny hard disk access unless continuing authorization is obtained from the authorization server 104.

The server 104 may include one or more processor(s) 134, computer readable media 136, and a database 138. The computer readable media 136 may include a location module 124 and an authentication module 134. For example, the location module 124 may determine a location of the computing device 102. To illustrate, the location module 124 may determine a location of the computing device 102 by analyzing routing information in data packets that the server 104 receives from the computing device 102, by receiving global positioning system (GPS) information provided by the computing device 102, by performing other location based calculations, or any combination thereof. The database 138 may include details associated with each computing device that the server 104 communicates with, including authorized computing devices and/or unauthorized computing devices from which the server 104 has received communications. For example, the database 138 may include N details (where N>0) associated with N computing devices, such as first computer details 140 associated with a first computing device and Nth computing computer details 142 associated with an Nth computing device. The database 138 may include M credentials (where M>0), such as first credentials 144 to M credentials 146.

The computing device 102 may send a request 150 to the server 104 for credentials to access secured data, such as the storage 114. The secured data may be located in the storage 114, on another computing device that is accessible using the network 106, or both. For example, at least a portion of the storage 114 may be encrypted and the credentials to decrypt the encrypted portion(s) of the storage 114 may be stored at the server 104 as one of the credentials 144 to 146. In some implementations, the computing device 102 may send the request 150 to a location identified by the service identifier 130. The request 150 may include the authentication information 132, and the authentication module 134 may retrieve computer details associated with the computing device 102 (e.g., one of the computer details 140 to 142) based on the authentication information 132. The authentication module 134 may determine, based on the authentication information 132 and the computer details associated with the computing device 102, whether the computing device 102 is authorized to receive the credentials. If the computing device 102 is authorized to receive the credentials, the server 104 may also determine what type of credentials the computing device 102 is authorized to receive. For example, different types of credentials may allow different levels of access (e.g., read-only or read-write) to different types of secured data.

In response to determining that the computing device 102 is authorized to receive the credentials, the server 104 may retrieve the corresponding credentials (e.g., one of the credentials 144 to 146) and send the credentials in a response 152 to the computing device 102. In some cases, the server 104 may securely write (or send) the credentials directly to the buffer 110 to avoid exposing the credentials to a user of the computing device 102. In some implementations, the credentials provided by the server 104 to the computing device 102 may be encrypted based on one or more of the service identifier 130, the authentication information 132, or other computer information (e.g., serial number) associated with the computing device 102. The authorization logic 128 may decrypt the credentials provided by the server 104 to the computing device 102.

The credentials may vary based on which computing device requests the credentials, a location of the computing device, and the like. For example, a first computing device may be provided first credentials that provide a first type of access while a second computing device may be provided second credentials that provide a second type of access. As another example, the computing device 102 may be provided one type of credentials when the computing device 102 is located at a first location and may be provided another type of credentials when the computing device 102 is located at another location.

In some cases, the authentication module 134 may determine a location of the computing device 102 and determine whether to provide credentials to the computing device 102 based on one or more of the location, the computer details associated with the computing device 102, or the authentication information 132. For example, the location module 124 may determine a location of the computing device 102 based on an analysis of a path (e.g., routing data) of the request 150. As another example, the location module 124 may determine a location of the computing device 102 based on location data sent in the request 150. To illustrate, the computing device 102 may include a GPS or another type of location determination component that provides location data for inclusion into the request 150.

If the server 104 determines that the computing device 102 is unauthorized to access the secured data (e.g., the storage 114), then the server 104 may not send or write the credentials to the computing device 102 such that the computing device 102 is unable to access the secured data. For example, if the authentication information 132 is invalid or the authentication information 132 is valid but the location of the computing device 102 does not fall within a set of authorized locations, then the server 104 may not provide credentials to access the secured data to the computing device 102. In some implementations, if the server 104 determines that the computing device 102 is unauthorized to access the secured data, the server 104 may instruct (e.g., in the response 152) the computing device 102 to perform a protective action, such as disabling one or more components of the computing device 102, such as the processor(s) 108, the storage 114, the NIC 118, the BIOS 122, etc. In other implementations, the computing device 102 may automatically (e.g., without human interaction) perform the protective action when the server 104 fails to provide the requested credentials.

The credentials provided by the server 104 may enable the computing device 102 to access (e.g., decrypt) secured data that is stored on the computing device 102 or on a network accessible device. The credentials provided by the server 104 may enable the computing device 102 to access a secure network, such as secured system 154. For example, the secured system 154 may include intellectual property, financial details, research and development information, or other confidential information of a corporate entity or government.

Thus, the system 100 may enable multiple computing devices, such as the computing device 102, to operate securely by storing credentials to access secured data on a central server (e.g., the server 104). Each computing device may have the authorization logic 128 embedded at a low-level (e.g., into one or more of the firmware 126, the firmware 126, or the BIOS 122). The authorization logic 128 may be embedded in such a way that any attempt to read or modify (e.g., tamper with) the authorization logic 128 may result in the computing device 102 performing one or more protective measures, such as disabling one or more of the components 108, 110, 112, 114, 118, 120, or 122.

Figure 2:
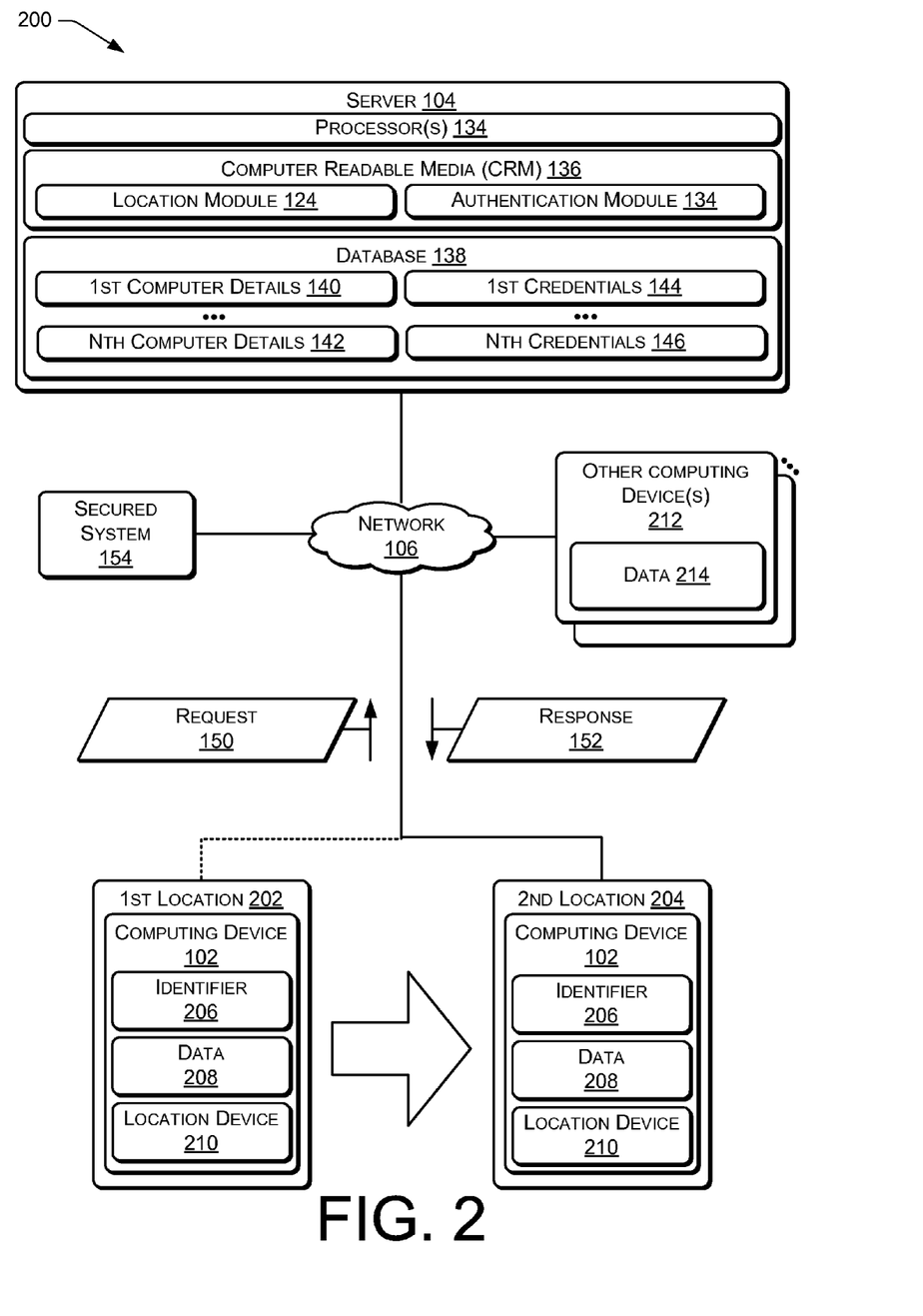
FIG. 2 is a block diagram illustrating a system for secure operations when a computing device is moved from a first location to a second location according to some implementations.

FIG. 2 is a block diagram illustrating a system 200 for secure operations when a computing device is moved from a first location to a second location according to some implementations. In FIG. 2, the computing device 102 may initially be located at a location 202. At a later point in time, the computing device 102 may be moved from the first location 202 to a second location 204.

The computing device 102 may include an identifier 206, data 208, and a location device 210. The identifier 206 may uniquely identify the computing device 102 from other computing devices 212 that may be communicatively coupled to the server 104 using the network 106. The identifier 206 may be included in the authorization logic 128. For example, the authentication information 132 may be used as the identifier 206. Each of the other computing devices 212 may similarly have a unique identifier embedded into the firmware of each of the corresponding computing devices. The location device 210 may be capable of providing location-related information associated with the location of the computing device 102. The location-related information may enable the server 104 to determine a location of the computing device 102. For example, the location device 210 may provide GPS information, network-related information (e.g., an identity of a local area network to which the computing device 102 is connected), information that enables the server 104 to triangulate the location of the computing device 102, or the like.

The data 208 may be stored in the storage 114 of the computing device 102. The data 208 may be encrypted such that the computing device 102 may request credentials from the server 104 to enable the computing device 102 to decrypt and access the data 208. For example, the data 208 may include an operating system, device drivers, one or more software applications, files, other types of data associated with a computing device, or any combination thereof. In some implementations, the data 208 may include the entire contents of the storage 114. For example, when the computing device 102 is powered on, the processors 108 may begin executing the BIOS 122. When the BIOS 122 is executing, the BIOS 122 may look for a storage device, such as the storage 114, from which to boot an operating system.

The authorization logic 128 may determine that the data 208 (e.g., at least a portion of the storage 114 that is needed to boot an operating system) is encrypted and send the request 150 to the server 104 requesting credentials to enable the BIOS 122 to boot the operating system. The request 150 may include the identifier 206 to enable the server 104 to identify that the request 150 was sent by the computing device 102 and to determine whether the computing device 102 is authorized to receive the requested credentials.

In some implementations, the server 104 may determine a location (e.g., one of the locations 202 or 204) of the computing device 102. For example, the server 104 may analyze routing information associated with the request 150 to determine the location of the computing device 102. As another example, the computing device 102 may include information (e.g., GPS information or other location-related information) to enable the server 104 to determine the location of the computing device 102.

The server 104 may retrieve computer details (e.g., one of the computer details 140 to 142) based on the identifier 206. The computer details may specify various capabilities of the computing device, such as a processor speed of the processors 108 of the computing device 102, a size of the CRM 112, a size of the storage 114, capabilities of the NIC 118, and the like. The computer details may also identify a type of the data that the computing device 102 may access (e.g., local data, network accessible data etc.), which locations the computing device 102 may access, at which locations the computing device 102 may access the data 208, other aspects of data access, or any combination thereof.

The server 104 may determine, based on one or more of the identifier 206, the data 208, the location (e.g., one of the locations 202 or 204) of the computing device 102, or the computer details (e.g., one of the computer details 140 to 142) associated with the computing device 102, whether the request 150 is valid. If the server 104 determines that the request 150 to access the data 208 is valid, e.g., the computing device 102 is authorized to access the data 208, the server 104 may select the corresponding credentials and send the credentials to the computing device 102 in the response 152. For example, the server 104 may select the credentials associated with the computing device 102 based on one or more of the identifier 206, the data 208, the location, or the computer details of the computing device 102. For example, the server 104 may determine that the computing device 102 is authorized to access the data 208 when the computing device 102 is located at the first location 202 but not when the computing device 102 is located at the second location 204.

If the server 104 determines that the computing device 102 is not authorized to access the data 208, the server 104 may cause the computing device 102 to perform one or more protective actions. For example, in some cases, the server 104 may instruct the computing device 102 to perform the protective actions. In other cases the computing device 102 may automatically (e.g., without human interaction) perform the protective actions after failing to receive credentials from the server 104. For example, after sending the request 150, the computing device 102 may automatically perform the protective actions after a predetermined time period has elapsed during which the credentials were not received.

The protective actions may include disabling one or more components (e.g., one or more of the processors 108, the computer readable media 112, the storage 114, the NIC 118, the BIOS 122, or the controller 120) or rendering the data 208 inaccessible. For example, rendering the data 208 inaccessible may include deleting or erasing the data 208, modifying at least a portion of the data 208, transferring the data 208 to another location over the network 106, etc. The protective actions may also include initiating a key logger to log the keystrokes of a user of the computing device 102, capturing a picture or a video of the user and transmitting the picture or video to the server 104, and other actions to identify who the user is and what they are doing.

In some cases, the computing device 102 may send the request 150 requesting credentials from the server 104 to access data 214 that is located at a network accessible location, such as in one of the other computing devices 212. The server 104 may determine, based on one or more of the identifier 206, the data 214, the location (e.g., one of the locations 202 or 204) of the computing device 102, or the computer details (e.g., one of the computer details 140 to 142) associated with the computing device 102, whether the request 150 is valid. If the server 104 determines that the request 150 to access the data 214 is valid, e.g., the computing device 102 is authorized to access the data 214, the server 104 may select the corresponding credentials and send the credentials to the computing device 102 in the response 152. If the server 104 determines that the computing device 102 is not authorized to access the data 214, the server 104 may cause the computing device 102 to perform one or more protective actions.

The computing device 102 may use the credentials received from the server 104 in different ways. For example, the computing device 102 may use the credentials to decrypt the data 208 stored on the computing device 102 or to decrypt the data 214 stored on one of the other computing devices 212. The credentials may be used to access a secure network, such as the secured system 154. For example, in response to a request from a user to access the secured system 154, the computing device 102 may send the request 150 to the server 104 to request one of the credentials 144 to 146. Of course, the credentials 144 to 146 may be used in other situations where secure access may be desired. For example, the first credentials 144 may enable the computing device 102 to decrypt the data 208, second credentials (stored on the server 104) may enable the computing device 102 to access the data 214, third credentials may enable the computing device 102 to access the secured system 154, and so on. In this example, each time credentials are to be used to access a particular system or particular data, the computing device 102 may request the credentials from the server 104. Because the server 104 centrally manages all the credentials, the server 104 can centrally manage access to the data 208, the data 214, the secured system 154, and/or other situations in which credentials may be used. In this way, if the computing device 102 is lost or stolen, the server 104 may revoke access privileges to all of the secured resources which were previously available to the computing device 102.

Thus, the system 200 may enable secure operations of a computing device, such as the computing device 102. The server 104 may determine whether the computing device 102 is authorized to access the data 208 stored in the computing device 102 or the data 112 stored on one or more other computing devices 212. The determination may take into account the identifier 206 and in some cases, also take into account other information, such as the location of the computing device 102 etc. If the server 104 determines that the computing device 102 is authorized to access the data 208 or 214, the server 104 may provide the computing device 102 with the credentials to decrypt and access the data 208 or 214. The system 200 provides secure operations because if the computing device 102 is lost or stolen, the credentials to decrypt and access the data 208 (or the data 214) are stored centrally in the server 104 rather than in the computing device 102 or in a memory of a user of the computing device 102.

Figure 3:
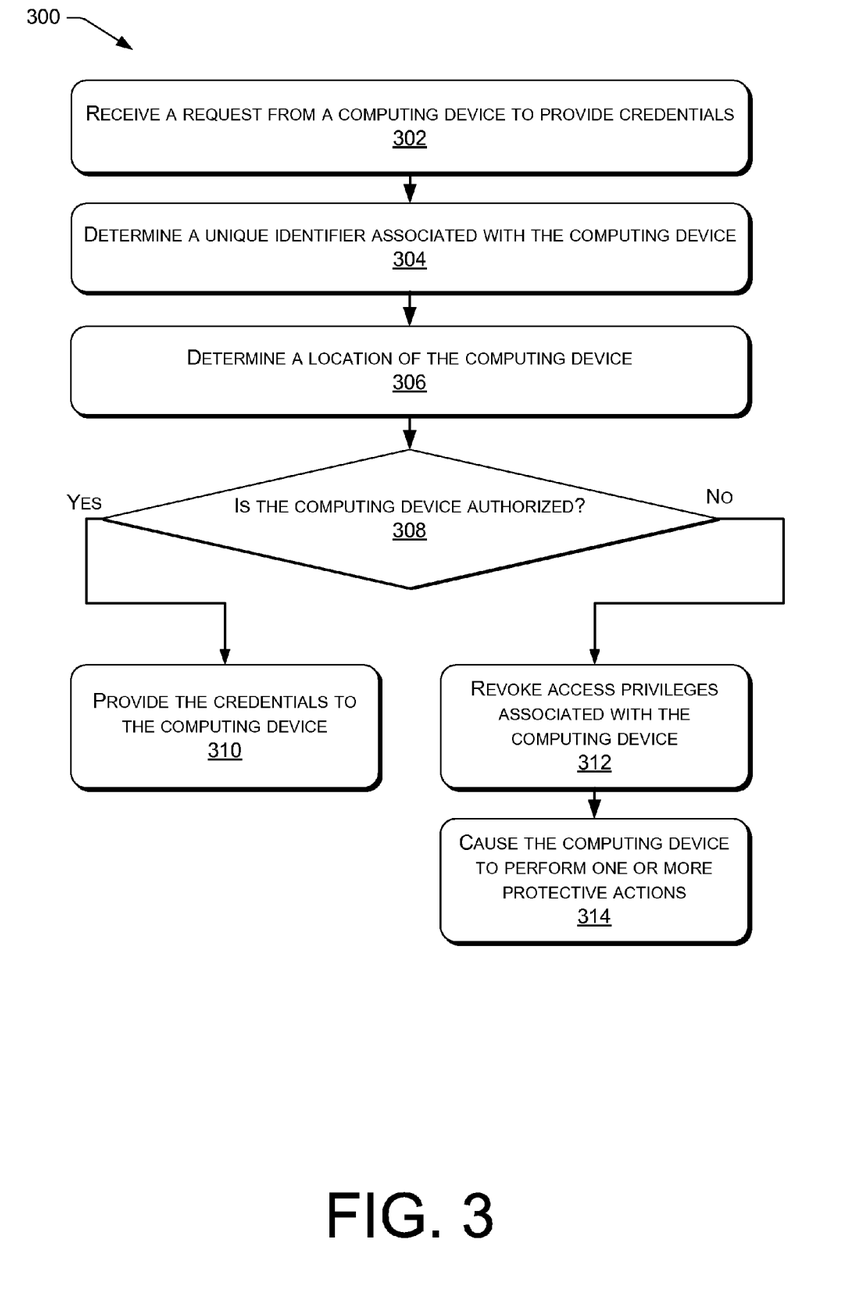
FIG. 3 is a flow diagram of an example process that includes receiving a request to provide credentials to decrypt data according to some implementations.

FIG. 3 is a flow diagram of an example process 300 that includes receiving a request to provide credentials to decrypt data according to some implementations. For example, the process 300 may be performed by the server 104 of FIG. 1 or FIG. 2.

At 302, a request may be received from a computing device to provide credentials. For example, in FIG. 2, the server 104 may receive the request 150 from the computing device 102. The request 150 may ask the server 104 to provide one of the credentials 144 to 146 to enable the computing device to access the data 208, the data 212, or the secured system 154.

At 304, a unique identifier associated with the computing device may be determined. For example, in FIG. 2, the computing device 102 may include the identifier 206 in the request 150 and the server 104 may, in response to receiving the request 150, retrieve the identifier 206 from the request 150. As another example, in FIG. 2, in response to receiving the request 150, the server 104 may request the identifier 206 from computing device 102. In some implementations, the identifier may be embedded into the firmware 124 of the NIC 118.

At 306, a location of the computing device may be determined. For example, in FIG. 2, the server 104 may determine a location of the computing device 102. The server 104 may determine the location of the computing device 102 based on location-related information in the request 150. For example, the location-related information may include routing information included in the request 150 (e.g., located in headers of packets used to send the request 150 to the server 104). As another example, the location-related information may include GPS data.

At 308, a determination is made whether the computing device is authorized (e.g., to access the secured data or the secured system). For example, in FIG. 2, the server 104 may retrieve corresponding computer details of the computing device 102 from the database 138 based on the identifier 206. The server 104 may determine whether the computing device 102 is authorized to decrypt and access the data 208 based on one or more of the identifier 206, a current location of the computing device 102, the data 208, or the corresponding computer details.

If a determination is made that the computing device is authorized to access the secured data, at 308, then the server may provide the credentials to the computing device, at 310. For example, in FIG. 2, in response to the server 104 determining that the computing device 102 is authorized to decrypt and access the data 208, the server 104 may include the corresponding credentials from the database 138 in the response 152 that is sent to the computing device 102.

If a determination is made that the computing device is unauthorized to access the secured data, at 308, then the server may revoke access privileges associated with the computing device, at 312.

At 314, the server 104 may cause the computing device 102 to perform one or more protective actions. For example, in FIG. 2, in response to the server 104 determining that the computing device 102 is unauthorized to access the data 208, the server 104 may perform various actions, including revoking access privileges of the computing device 102, causing the computing device to take one or more protective actions etc. For example, the protective actions may include disabling one or more components of the computing device 102 or rendering the data 208 inaccessible (e.g., by deleting or modifying portions of the data 208).

Thus, when a BIOS of a computing device attempts to boot from a storage device of the computing device, the BIOS may determine that at least a portion of the storage device (e.g., hard drive or solid state storage drive) is encrypted, thereby preventing the computing device from booting. Authorization logic in the BIOS may send a request to a server for credentials to decrypt and access contents of the encrypted storage device. The server may be identified by a service identifier that is stored in the firmware of the computing device. The computing device may provide the server with a unique identifier to enable the server to determine whether the computing device is authorized to access the encrypted content on the storage device. If the server determines that the computing device is authorized to access the encrypted content, the server may provide the credentials to the computing device and the computing device may decrypt the encrypted portions of the storage device and resume booting the computing device. If the server determines that the computing device is unauthorized to access the encrypted content, the server may perform various protective actions.

Figure 4:
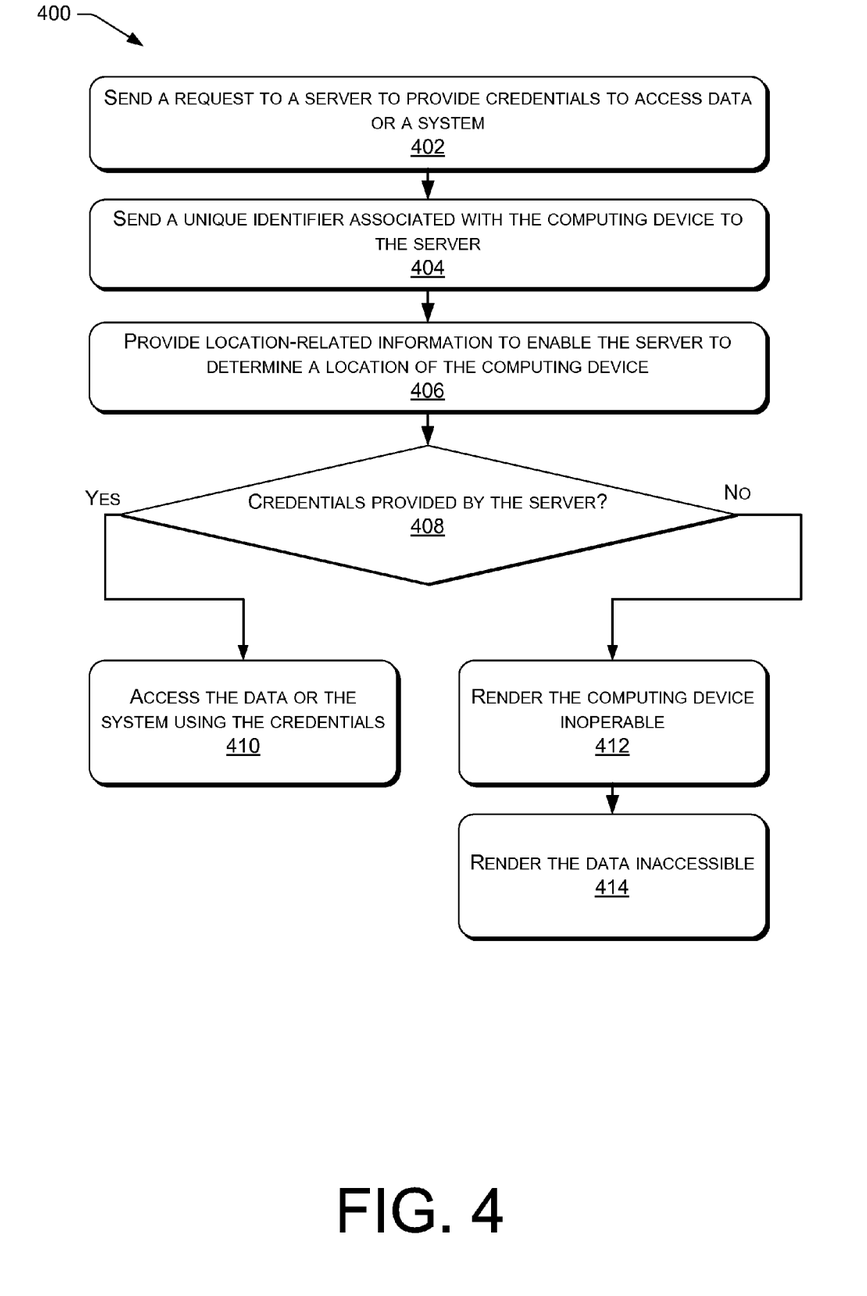
FIG. 4 is a flow diagram of an example process that includes sending a request to provide credentials to decrypt data according to some implementations.

FIG. 4 is a flow diagram of an example process 400 that includes sending a request to provide credentials to decrypt data according to some implementations. For example, the process 400 may be performed by the computing device 102 of FIG. 1 or FIG. 2.

At 402, a request may be sent to a server to provide credentials (e.g., to access secured data or a secured system). For example, in FIG. 2, the computing device 102 may send the request 150 to the server 104. The request 150 may ask the server 104 to provide one of the credentials 144 to 146 to enable the computing device to decrypt and access data that is accessible to the computing device 102, such as the data 208 and/or the data 214, or to access a secured system, such as the secured system 154.

At 404, a unique identifier associated with the computing device may be sent to the server. For example, in FIG. 2, the computing device 102 may include the identifier 206 in the request 150 and the server 104 may, in response to receiving the request 150, retrieve the identifier 206 from the request 150. As another example, in FIG. 2, in response to receiving the request 150, the server 104 may request the identifier 206 from computing device 102. The identifier 206 may enable the server 104 to determine whether the computing device 102 is authorized to decrypt and access the data 208 and/or the data 214.

At 406, location-related information may be provided to the server to enable the server to determine a location of the computing device. For example, in FIG. 2, the server 104 may determine a location of the computing device 102. The server 104 may determine the location of the computing device 102 based on location-related information in the request 150. For example, the location-related information may include routing information included in the request 150 (e.g., located in headers of packets used to send the request 150 to the server 104). As another example, the location-related information may include GPS data.

At 408, a determination may be made whether the server has provided the credentials. For example, in FIG. 2, the server 104 may retrieve corresponding computer details of the computing device 102 from the database 138 based on the identifier 206. The server 104 may determine whether the computing device 102 is authorized to decrypt and access the data 208 based on one or more of the identifier 206, a current location of the computing device 102, the data 208, or the corresponding computer details.

If a determination is made that the server has provided the credentials, at 408, then the computing device may access the secured data or the secured system using the credentials, at 410. For example, in FIG. 2, in response to the server 104 determining that the computing device 102 is authorized to access the data 208, the data 212, or the secured system 154, the server 104 may include the corresponding credentials from the database 138 in the response 152 that is sent to the computing device 102. The computing device 102 may use the credentials to decrypt the data 208, decrypt the data 214, and/or access the secured system 154.

If a determination is made that that the server has not provided the credentials, at 408, then the computing device may be rendered inoperative, at 412.

At 414, the data may be rendered inaccessible. For example, in FIG. 2, in response to the server 104 determining that the computing device 102 is unauthorized to access the data 208, the server 104 may not provide credentials to access the data 208 and/or the data 214. If the computing device 102 does not receive the credentials from the server 104 within a predetermined period of time after sending the request 150, the computing device 102 may automatically perform one or more protective actions.

Thus, when a BIOS of a computing device attempts to boot from data stored on the computing device or stored on the cloud (e.g., stored on another computing device), the BIOS may determine that at least a portion of the data is encrypted, thereby preventing the computing device from booting. Authorization logic in the BIOS may send a request to a server for credentials to decrypt and access contents of the encrypted data. The server may be identified by an address (e.g., the service identifier 130 of FIG. 1) that is stored in the firmware of the computing device. The computing device may provide the server with a unique identifier to enable the server to determine whether the computing device is authorized to access the encrypted data. If the server determines that the computing device is authorized to access the encrypted data, the server may provide the credentials to the computing device and the computing device may decrypt the encrypted data and resume booting the computing device. If the server determines that the computing device is unauthorized to access the encrypted content, the server may perform various protective actions.

The protective actions may include one or more of various different actions and/or restrictions. For example, protective actions may include some type of storage protection with regard to non-volatile storage devices of the computing device 102. Storage protection may include denying or limiting access to all or certain parts of the storage 114. Storage protection may further include erasing all or a portion of the non-volatile storage associated with the computing device 102. Storage protection may in some implementations comprise physically damaging or destroying all or a portion of the non-volatile storage associated with the computing device 102.

Encryption/decryption capabilities of mass storage devices may be utilized in conjunction with storage protection. Specifically, certain storage devices such as hard disks may have integral encryption/decryption capabilities, and may be further configured in accordance with the techniques described herein to attempt to obtain authorization from the authorization server 104 prior to providing decryption services. Upon a failure to obtain such authorization, the storage devices may be configured to either deny decryption services, or to erase protected portions of the storage.

The protective actions may include some form of boot protection, such as refusing to boot the computing device 102 or to continue the boot process. Thus, if the computing device 102 does not receive the credentials from the server 104 within a predetermined period of time after sending the request 150, the computer may become non-functional, thereby protecting any data and functionality that might otherwise be exposed.

The protective actions may include communications protection. For example, the NIC 118 of the computing device 102 may be disabled or its capabilities might be limited. This might be particularly appropriate when the provisioning/authorization logic is located in the firmware of the network interface. In this situation, the network interface, upon startup, may attempt to obtain authorization from the authorization server 104, and upon failure to receive such authorization may limit its future communications to certain types of traffic or to certain other network entities.

The protective actions may include may also include activating remote reporting techniques. For example, the computing device 102 may be allowed to boot, but may be monitored and any activities performed on the computer may be reported surreptitiously to the authorization server 104 or to some other monitoring entity. This may allow identification of the person or entity that currently possesses the computing device 102. Monitoring may include location monitoring, such as by using geographic sensing capabilities of the computer to report current locations of the computer. Monitoring may also include photographic monitoring, such as by capturing images with a computer's integral camera and sending the captured images back to the authorization server 104. Other types of monitoring may also be used, such as reporting keystrokes, browsing history, viewed content, and so forth.

The various activities, protections, measures, and functionality described above may be distributed among various components of the computing device 102, particularly among the different firmware of components of the computing device 102. The firmware itself may be configured in such a way that it is tamper-proof, tamper-resistant, and/or tamper-evident, so that it is impractical for someone in possession of the computer to alter the computer hardware. Furthermore, the provisioning/authorization logic 128 may be physically integrated with the encryption/decryption capabilities of a storage device, so that it becomes impractical to bypass the security-related functionality described above without destroying or breaking the encryption/decryption capabilities of the storage device.

Generally, the authorization server 104 may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises. In some implementations, a service may offer only a portion of the functionality described above, such as either the provisioning services or the authorization services.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A server comprising:
   one or more computer readable media storing specific computer-executable instructions; and
   one or more hardware processors in communication with the one or more computer readable media, the one or more hardware processors configured to execute the specific computer-executable instructions to at least:
      receive a request from a computing device to provide credentials to access secured data stored on the computing device, the request including a unique identifier associated with the computing device, the unique identifier embedded into a firmware of a component of the computing device;
      determine a location of the computing device;
      based at least partly on the unique identifier, determining whether the computing device is authorized to access the secured data when the computing device is located at the location; and
      in response to determining that the computing device is authorized to access the secured data,
      send the credentials from the server to a buffer in the computing device, wherein the buffer is accessible to an authorization component of the computing device but is inaccessible to other components of the computing device.

2. The server of claim 1, the one or more processors configured to further execute the specific computer-executable instructions to at least:
   receive a second request from a second computing device to provide second credentials to access second secured data stored on the second computing device;
   determine that the second computing device is not authorized to access the second secured data;
   revoke access privileges associated with the second computing device; and
   instruct the second computing device to perform at least one protective action.

3. The server of claim 2, wherein the at least one protective action includes at least one of capturing user input received by the second computing device, activating a camera associated with the second computing device, disabling a storage device that is accessible to the second computing device, disabling a network interface card of the second computing device, deleting the second secured data, or modifying the second secured data.

4. The server of claim 2, wherein:
   the second secured data includes at least a portion of an operating system; and
   revoking the access privileges comprises preventing the second computing device from loading the portion of the operating system.

5. A computing device comprising:
   one or more computer readable media storing specific computer-executable instructions; and
   one or more hardware processors in communication with the one or more computer readable media, the one or more hardware processors configured to execute the specific computer-executable instructions to at least:

during a boot-up process of the computing device, send a request to a server to provide credentials to the computing device, the credentials used by the computing device to decrypt data that is accessible to the computing device;
send, to the server, an identifier that uniquely identifies the computing device and information enabling the server to determine a location of the computing device, the identifier embedded into a firmware of a network interface of the computing device;
receive the credentials, from the server, in a buffer of the computing device, wherein the buffer, when the computing device is located at the location determined by the server, is accessible to an authorization component of the computing device but is inaccessible to other components of the computing device; and
access one or more secured resources using the credentials.

6. The computing device of claim 5, wherein the data that is accessible to the computing device is stored on the computing device.

7. The computing device of claim 5, wherein the data that is accessible to the computing device is stored on the one or more secured resources.

8. The computing device of claim 5, wherein the data that is accessible to the computing device includes at least one of an operating system, a device driver, or a software application.

9. The computing device of claim 5, wherein:
the request to the server includes location-related information that enables the server to determine a location of the computing device; and
the location-related information includes at least one of global positioning system information, routing-related information, or network-related information.

10. The computing device of claim 5, wherein:
the computing device further comprises a storage device; and
the one or more secured resources include data that is stored on the storage device.

11. The computing device of claim 5, wherein:
the authorization component of the computing device comprises a network interface card; and
the identifier is stored in the firmware of the network interface card.

12. The computing device of claim 5, wherein:
the authorization component comprises a basic input output system (BIOS); and
the identifier is stored in the BIOS.

13. The computing device of claim 5, wherein:
the credentials are received in the buffer without exposing the credentials to a user that is accessing the computing device.

14. The computing device of claim 5, wherein the one or more processors are further configured to execute the specific computer-executable instructions to at least:
decrypt the credentials in response to determining that the credentials are encrypted.

15. A computer-implemented method comprising:
under control of one or more processors configured with specific instructions, the computer-implemented method comprising:
during a boot-up process of a computing device, sending a request from the computing device to a server to provide credentials to the computing device that enable the computing device to access a secured resource, the request including:
an identifier that uniquely identifies the computing device, the identifier embedded into a firmware of a network interface of the computing device, and information enabling the server to determine a location of the computing device;
receiving the credentials from the server in a buffer that, when the computing device is located at the location determined by the server, is accessible to an authorization component of the computing device but is inaccessible to other components of the computing device; and
accessing the secured resource using the credentials.

16. The computer-implemented method of claim 8, further comprising:
sending, after the credentials have expired, a second request from the computing device to the server to provide second credentials to access the secured resource;
failing to receive the second credentials from the server within a predetermined period of time after sending the second request; and
performing at least one of rendering the computing device inoperable or rendering the secured resource inaccessible.

17. The computer-implemented method of claim 15, wherein the secured resource comprises at least one of data stored on the computing device, data stored on a network accessible device, or a system of networked computers.

18. One or more non-transitory computer readable media storing instructions that are executable by one or more processors to perform operations comprising:
receiving, from a computing device, a request to provide credentials to access one or more secured resources stored on the computing device, the request including a unique identifier associated with the computing device, the unique identifier embedded into a firmware of a component of the computing device;
determine a location of the computing device;
performing an authentication of the computing device based at least partly on the unique identifier associated with the computing device and based at least in part on the location of the computing device; and
in response to successfully authenticating the computing device, providing the credentials to a buffer in the computing device, the credentials enabling the device to access the one or more secured resources, wherein the buffer is accessible to an authorization component of the computing device but is inaccessible to other components of the computing device.

19. The one or more non-transitory computer readable media of claim 18, the operations further comprising:
receiving, from a second computing device, a second request to provide second credentials;
failing to authenticate the second computing device; and
performing at least one of:
causing the second computing device to render the one or more secured resources inaccessible to the second computing device;
limiting which of the one or more secured resources the second computing device is able to access;
instructing the second computing device to wipe a storage drive of the second computing device;
instructing the second computing device to disable networking capabilities of the second computing device; or
blacklisting the second computing device to prevent the second computing device from accessing remote information stored on a networked location.

20. The one or more non-transitory computer readable media of claim 18, wherein the one or more secured resources include data stored on the computing device and additional data stored on another computing device connected by a communication network.

21. The one or more non-transitory computer readable media of claim 18, wherein providing the credentials to the computing device comprises:
   determining a location of the computing device;
   determining a type of credentials associated with the computing device based at least in part on the unique identifier and the location; and
   selecting the credentials from multiple credentials based at least in part on the type of credentials that are associated with the computing device.

22. The one or more non-transitory computer readable media of claim 21, wherein determining the location comprises:
   performing an analysis of routing information associated with the request; and
   determining the location of the computing device based at least in part on the routing information.

23. The one or more non-transitory computer readable media of claim 18, wherein providing the credentials to the computing device comprises:
   sending the credentials to a buffer in the computing device without exposing the credentials to access by a user of the computing device.

* * * * *